United States Patent [19]

Allen et al.

[11] 4,293,396

[45] Oct. 6, 1981

[54] THIN CARBON-CLOTH-BASED ELECTROCATALYTIC GAS DIFFUSION ELECTRODES, AND ELECTROCHEMICAL CELLS COMPRISING THE SAME

[75] Inventors: Robert J. Allen, Saugus; Robert Lindstrom, Gloucester; Walter Juda, Lexington, all of Mass.

[73] Assignee: Prototech Company, Newton Highlands, Mass.

[21] Appl. No.: 79,470

[22] Filed: Sep. 27, 1979

[51] Int. Cl.³ .............................................. C25C 1/12
[52] U.S. Cl. ...................................... 204/106; 429/27; 429/42; 429/44
[58] Field of Search .......................... 429/40–45, 429/27, 206; 204/106; 427/115, 122, 113, 123

[56] References Cited

U.S. PATENT DOCUMENTS

| | | | |
|---|---|---|---|
| 3,877,994 | 4/1975 | Chottiner | 429/42 |
| 3,899,356 | 8/1975 | Groult | 429/42 |
| 4,044,193 | 8/1977 | Petrow et al. | 429/40 |
| 4,159,367 | 6/1979 | Berchielli et al. | 429/42 X |
| 4,175,055 | 11/1979 | Goller et al. | 429/42 X |

Primary Examiner—Charles F. LeFevour
Attorney, Agent, or Firm—Rines and Rines, Shapiro and Shapiro

[57] ABSTRACT

This disclosure is concerned with thin gas diffusion electrodes comprising an open pore carbon cloth substrate provided with a uniform mixture of catalytic carbon particles and preferably Teflon particles adhered within the cloth poes and to the yarns of the cloth; processes for making and using the same; and assemblies comprising said electrodes and closely spaced preferably noble metal current collecting contacts for use in electrochemical cells operating at high current densities.

17 Claims, 3 Drawing Figures

THIN CARBON-CLOTH-BASED ELECTROCATALYTIC GAS DIFFUSION ELECTRODES, AND ELECTROCHEMICAL CELLS COMPRISING THE SAME

This invention relates to electrocatalytic gas diffusion electrodes and processes for making and using the same; being more particularly directed to thin carbon-cloth-based hydrogen or other ionizable fuel anodes and to air, (oxygen) or other ionizable oxidant cathodes, and to a variety of acid and alkaline electrolyte-containing electrochemical cells embodying the said electrodes, including metal electrowinning cells, caustic-chlorine cells, metal air batteries and fuel cells and the like.

Gas diffusion electrodes are important tools for converting chemical energy directly and efficiently into electrical energy. In the case of fuel cells, the product is electricity generated by the ionization of hydrogen or other ionizable fuel at an electrocatalytic anode, and by the ionization of oxygen plus water or other ionizable oxidant at an electrocatalytic cathode in an invariant and stationary acid or alkali electrolyte. The currently developing hydrogen- air phosphoric acid fuel cell, for example, consists of many cells of thin hydrogen and air electrodes separated by thin acid-filled matrices, the cells being stacked electrically in series, with current collector plates (designed to allow access of air to one side and hydrogen to the other side) inserted between the cells, and with phosphoric acid electrolyte immobilized within the matrices. In contrast, metal electrowinning cells, as disclosed, for example, in U.S. Pat. No. 3,793,165 of common assignee of the present invention and also of U.S. Pat. Nos. 3,262,868 and 3,124,520, utilize a flowing metal-ion-containing electrolyte and a metal cathode in conjunction with a hydrogen anode. In view of the need to remove cathodic metal produced in this type of process, a series connection of cells is usually impractical and, therefore, the current has to be collected from each hydrogen anode. Similarly, air cathodes are advantageous, for example, in chlor-alkali cells and more particulary in such cells comprising ion-exchange membranes wherein substantially chloride free caustic is produced at the cathode, as, for example, also disclosed in said U.S. Pat. No. 3,124,520. Here again the caustic catholyte is flowed through the cell and is removed as one product of manufacture. It is, therefore, usually desireable to collect the current from each air cathode. Metal air batteries are other well known cells utilizing air cathodes. Of special interest is the recently proposed aluminum-air battery intended for automotive use, as disclosed in "Metal-Air Batteries for Automotive Propulsion" by J. F. Cooper and E. L. Littauer, submitted to the 13th Intersociety Energy Conversion Conference, 1978. Since, in this application, the battery is to be mechanically recharged by replacing the aluminum anode, and since the anode dissolution product (in this case hydrargellite) is removed periodically, it is again preferable to provide current collection separately from each cathode.

In the cases of fuel cells, batteries and even the copper electrowinning process disclosed in the above-mentioned U.S. Pat. No. 3,793,165, electricity is produced either for its own sake or as a by-product of, for example, copper production. In other metal electrowinning, e.g. zinc electrowinning, as well as in chlor-alkali production, the electric energy requirement is substantially reduced by the use of the gas diffusion electrode. Here, part of the electricity is produced in situ from the hydrogen or other active gas (such as sulfur dioxide) fed to the anode, and the air or oxygen fed to the cathode, respectively.

These cells and others comprising gas diffusion electrodes disclosed in the literature have often been held back from commercial application because of the unavailability of sufficiently inexpensive, and well-performing and durable gas diffusion electrodes.

As disclosed, for example, in such standard texts as "Fuel Cell", edited by G. J. Young, Reinhold Publishing Corporation, New York, 1960 and "Fuel Cells", A Review of Government-Sponsored Research, by L. G. Austin, Scientific and Technical Information Division NASA, 1967, and in the patent literature, for example, in U.S. Pat. Nos. 3,859,139, 3,912,538 and 4,043,933, known gas diffusion electrodes comprise a gas-porous electrically-conducting substrate which is, typically, either (1) a metallic screen, expanded or porous sintered metal or the like, (2) a thick porous carbon or graphite plate, block or the like, or, more recently, (3) a thin carbon paper.

It is also well known in the prior art that such substrates advantageously carry a uniform mixture of wet-proofing binder, preferably fluorinated hydrocarbon polymers, herein referred to as Teflon, with an electrocatalytic particulate noble metal, preferably platinum, uniformly deposited on finely divided high surface area porous carbon carrier particles, as is disclosed for example, in U.S. Pat. No. 4,044,193 of common assignee with the present invention.

When air or oxygen electrodes are used in a basic electrolyte (e.g. KOH or NaOH), carbons have long been known to be adequate electrocatalysts in the absence of a noble metal, usually for relatively short term use, as is the case of, for example, some primary metal-air batteries, such as a zinc-air battery.

Thin non-noble metal screens and similar substrates of the prior art, such as nickel or steel screens, are unusable in acid electrolytes as they dissolve therein. Further, we have found that such non-noble metals have a serious chemical defect even in aqueous alkaline electrolytes, when they are used in air electrodes comprising the above described catalytic carbon-Teflon particle mixture bonded to the substrate. Oxidation occurs at the interface of the metallic substrate and the catalytic carbon when both are in contact with the alkaline electrolyte and air (or oxygen). This oxidation results either in continuously progressive corrosion of the metallic substrate, as is the case of, for example, steel, or in the formation of an adherent metal oxide coating, such as is the case of, for example, nickel or tantalum. This oxidation constitutes a serious drawback in that it renders the progressively corroding metals, e.g. steel, useless for long-term cell operation; or it increases the electrical resistance of the oxide-coated metals, e.g. nickel and tantalum, lowering electrode performance. It is plausible to attribute this hitherto unrecognized detrimental phenomenon to an electrolytic corrosion current generated by a local shorted non-noble-metal-air (or oxygen) couple. Whatever the explanation, non-noble metallic substrates are clearly undesirable from a corrosion standpoint, in addition to the inherent high cost of thin woven metal screens or sintered metals, relative to the cost of carbons. Noble metal screen substrates, such as silver screens in alkaline electrolytes, or platinum screens in acid electrolytes, while performing satisfactorily, are usually ruled out because of their excessive cost. In short, metallic substrates are clearly undesirable from a corrosion and/or cost standpoint.

Much of the earlier prior art has focused on porous carbon or graphite which, however, is inherently structurally too weak to be useable in thicknesses much below $\frac{1}{8}''$. Electrodes based on rigid relatively thick (more than $\frac{1}{8}''$) porous carbon plate or block substrates have been studied extensively with emphasis on the effect of pore diameter, percent porosity and gas permeability on electrode performance. Besides being bulky, they are not uniformly porous. Electrodes comprising the same have the catalyst layer usually localized on the face of the plate in contact with the electrolyte to minimize the electrolyte flooding problem. Thus, the gas must be made to diffuse into the other face through a maze of non-uniform tortuous micropores to the catalyst layer, which uneven diffusion lowers electrode performance.

To the contrary, thin porous electrodes are not only advantageous from a weight and volume standpoint, but they permit easy substantially uniform short-path diffusional access of the gas, under minimal pressures, to the active sites of the catalyst layer in contact with the electrolyte.

The relatively recent advent of thin porous carbon paper-based electrodes, as disclosed, for example in U.S. Pat. No. 3,912,538, has overcome the drawbacks of bulk and has shortened the diffusion path. But thin porous carbon paper substrates are very fragile and they are subject to excessive flooding with electrolyte which interferes with the access of the gas to the electrocatalytic sites of the electrodes. To control the flooding, the carbon papers are often rendered hydrophobic by means of, for example, a Teflon coating which, however, increases their electrical resistivity. In addition, because of their structural weakness, they tend to break in handling as well as in cells operating under moderate gas pressures such as are needed to prevent electrode flooding, particularly when such cells involve a free-flowing electrolyte. Because of their resistivity and fragility, they are supported by a matrix on the electrolyte side, which limits their usefulness, for practical purposes, to stacks of fuel cells, in which the electrolyte is invariant and immobilized within the matrix. Finally, the wet-proofed carbon papers have to be dense to provide a minimum of structural integrity. This characteristic confines the catalytic layer to a surface coating bonded merely to one face of the paper substrate; and, being papers, they are inherently non-uniform with respect to porosity.

Surprisingly, we have now found that thin electrocatalytic gas diffusion electrodes comprising substantially uniform open-pore carbon cloth or graphite cloth substrates (hereinafter generically referred to as carbon cloth) of thickness in the range of about 5 to 40 mils, and preferably about 10 to about 35 mils, and a uniform mixture of Teflon or similar wet-proofing particles and catalytic carbon particles embedded and adhered within the cloth pores, have unexpectedly improved electrochemical performance, as well as so much improved structural strength and integrity as to render them also suitable for use in free-flowing electrolyte-containing electrochemical cells, in contrast to the porous carbon-based electrodes of the prior art. The catalytic carbon particles, as the term is used in this specification and in the appended claims, are either metal-free catalytic carbon particles as later described, or, preferably, porous finely divided high surface area carbons carrying suitable known noble metal catalytic particles, including platinum, palladium, rhodium, iridium, ruthenium and silver, the choice depending on the environment (e.g. acid or alkali, air or hydrogen) and on operating conditions (temperature, current density, intended length of service and others). The platinum-on-carbon described in the above-mentioned U.S. Pat. No. 4,044,193 is often the preferred catalyst because of its superior performance and durability. In the special case of an air (oxygen) electrode in an alkaline medium, high surface area porous carbon particles without noble metals are reasonably effective catalysts in and of themselves for oxygen plus water reduction and such and related catalytic carbons are referred to herein as metal-free catalytic carbon particles.

An object of the invention accordingly, is to provide a new and improved thin electrically conducting cloth-based electrocatalytic gas diffusion electrode providing the above and other advantages over previous screen sintered, porous carbon or carbon paper electrodes and the like.

A further object is to provide novel processes for making and using such electrodes, and novel electrode assemblies and electrochemical cells embodying the same.

Other and further objects will be explained hereinafter and are delineated in the appended claims.

In summary, from one of its important aspects, the invention embraces a thin electrocatalytic gas diffusion electrode comprising an open pore electrically conducting carbon cloth having a coating of a uniform mixture of catalytic carbon particles and hydrophobic binder particles evenly deposited on said cloth, with said mixture of particles adhered within the cloth pores and to the yarns of the cloth.

Preferred details and best mode embodiments are hereinafter presented.

The invention will now be described in connection with the accompanying drawing, FIG. 1 of which is an idealized fragmentary view, upon an enlarged or magnified scale, of a section of the preferred electrode construction of the invention;

Figure 1:
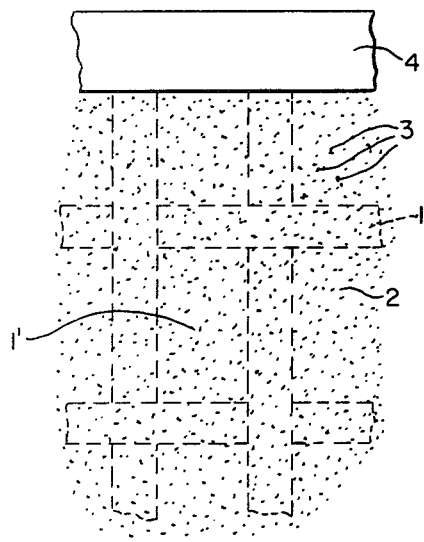

Referring to FIG. 1, a suitable substrate in accordance with the invention is an open pore uniform woven carbon cloth 1 made by carbonization, at high temperature, of pre-woven carbonaceous fabrics, as described, for example, in Report No. AFML-TR-77-68 entitled "Replacement Carbon Fibers for Thermal Protection Application", by D. L. Schmidt of the Air Force Materials Laboratories, August, 1977. To provide suitable uniform openings or open pores we prefer a carbon cloth construction having a warp-to-fill ratio of about unity ($\pm 10\%$), as shown, with between about 25 and 50 yarns per inch. The carbon content of the cloth should be in excess of 97% by weight, and preferably at least 99% per weight to avoid undesirable impurity interaction with the electrolyte. We have found that thicknesses of cloth 1 between 5 and 40 mils are suitable in that they combine good structural strength with uniformity. Cloth substrates having thicknesses in excess of 40 mils are unnecessarily expensive and begin to be easily flooded with tenaciously retained electrolyte; and cloth substrates thinner than 5 mils tend to be structurally too weak and too deformable.

Carbon cloths of the above preferred characteristics in thickness range of 5–40 mils are now readily available from commercial suppliers including, among others, Union Carbide Company and the Stackpole Fibers Company.

Especially good performance has been obtained with cloths varying in thickness between about 10 and 35 mils, as exemplified in materials sold by the Stackpole Fibers Company under the generic trade name PANEX. By way of specific example, suitable cloth identified as PANEX PWB-3 has the following typical properties: Construction (warp over fill): 38/38 yarn-/inch; thickness 14 mils.

To prepare an electrode of this invention, a catalytic carbon-Teflon liquid suspension mixture such as, for example, is disclosed in said U.S. Pat. No. 4,044,193, is applied to the carbon cloth substrate, as by coating, care being taken to make said mixture penetrate the openings or open pores 1' of the cloth at least partially and sometimes throughout the cloth. The coated cloth is then dried to remove water, and is thereafter heated to a temperature between about 290° C. and 350° C. for about 3 to about 60 minutes, whereby the catalytic carbon particles 3 and Teflon particles 2 are made to bind together and to adhere to the yarns of the cloth within the cloth pores 1' as shown in FIG. 1.

Surprisingly, thin electrodes of substantially improved electrocatlaytic performance and excellent structural strength are thus obtained, in comparison with prior thin carbon paper-based electrodes. Additionally, the cloth-based electrodes are simpler to produce than the paper-based electrodes because the steps of embedding and heating the catalytic carbon-Teflon mixture 3-2 within the pores 1' of the cloth 1 results in wet-proofing of the yarns of the cloth, thereby obviating the necessity of rendering the carbon cloth hydrophobic by a Teflon pretreatment, or otherwise, prior to catalyst application,—a pretreatment usually called for in the case of the carbon paper substrate. While we do not wish to be held to any particular theory, it is plausible to attribute the improved performance of the electrodes of this invention to the uniformity of the catalyst layer evenly embedded within the cloth, to the short diffusion path of the gas to said even catalyst layer; to the more uniform and greater direct exposure of catalyst to the gas; and to the lower electric resistivity of the substrate compared to that to the Teflon-coated hydrophobic paper substrate. The cloth-based electrodes are also somewhat stiffened and are not fragile and retain mechanical stability and electrochemical performance over thousands of operating hours. The catalytic carbon-to-carbon cloth binding involved in this structure moreover, provides the further desireable attribute of similar temperature coefficients of expansion and contraction resulting in mechanical integrity.

Specifically, the preferred electrodes of this invention are made by the methods or processes illustrated in the following examples, it being understood by those skilled in the art that many variations may be made without departing from the scope of the invention, as described in this specification and the appended claims.

EXAMPLE 1

A platinum-on-carbon sample was prepared substantially in accordance with Example 1, col. 9 of U.S. Pat. No. 4,044,193, the pH being adjusted to 3 during the preparation. The air-dried material, containing 9.9% by weight of platinum on Vulcan XC-72 carbon, which carbon has a surface area of approximately 200 $m^2/g$, was compounded with 50% by weight of wet-proofing fluorinated hydrocarbon, herein referred to as Teflon, whereby a typical catalytic carbon-Teflon mixture was formed. The compounding may advantageously use the technique described in commonly owned U.S. Pat. No. 4,166,143 (incorporated herein by reference). In this example 1.0 grams of the platinum-on-Vulcan carbon was suspended in 60 ml of distilled water containing 1.4 g/l of lanthanum sulfate. The suspension was ultrasonically dispersed and 11.75 ml of the aqueous colloidal Teflon dispersion described in col. 1 lines 35–44 of U.S. Pat. No. 4,155,143, containing 85 g/l, was added and the stirring was continued for 5 minutes, whereby the Teflon is completely flocced forming the uniform catalytic carbon-Teflon mixture 3-2. The floc-containing liquid suspension is then filtered, leaving, on the filter, the mixture in a form of a paste suitable for coating the substrate. The coating procedure consisted in applying 0.38 gms of the paste to 9 sq inches of the above described carbon cloth PANEX PWB-3, the paste being spread uniformly on the surface and into the open pores of the cloth. The coated fabric is then heated to 340° C. for about 20 minutes. The resulting electrode had a platinum loading of 0.32 $mg/cm^2$ of electrode area, the platinum being in the form of particles predominantly in the 15–20 Angstrom range.

Note that the term platinum particles, as used herein, refers not only to metallic platinum but also to oxides of platinum which may be formed in the preparation of the high surface area platinum particles.

EXAMPLE 2

The process of Example 1 was repeated except that the platinum-on-carbon sample was prepared by depositing the platinum-containing sol described in col. 4 of U.S. Pat. No. 4,044,193 on Vulcan XC-72, using 225 ml of sol containing 40 gms/l of platinum and 90 gms of Vulcan XC-72. The resulting electrode had a Pt loading of 0.33 $mg/cm^2$.

EXAMPLE 3

The method of Example 2 was repeated except that a high surface area carbon known as Norit A, described in the NORIT Bulletin of the American Norit Company of Jacksonville, Florida, 1975, having a surface area of about 900 $m^2/g$, was substituted for the Vulcan XC-72 carbon.

EXAMPLE 4

The process of Example 1 was repeated, except that here the Vulcan XC-72 was first partially graphitized by heating to yield a porous carbon having a surface area of about 70–80 $m^2/g$.

In general, the porous high surface area carbons suitable for the purposes of this invention are the known porous carbon (including graphitized carbon) catalyst carriers of surface area in excess of about 50 $m^2/g$.

In the above examples, there are used the preferred platinum catalyst particles substantially all in the range of 15–25 Angstroms in size. This platinum is preferably prepared from a platinum sulfite complex described, for example, in U.S. Pat. No. 4,044,193.

The platinum-on-carbon can be replaced, or used in combination with, palladium-on-carbon, rhodium-on-carbon or ruthenium-on-carbon, the latter three being also formed by oxidation of a complex sulfite of palladium, rhodium and ruthenium, respectively, using, for example, the oxidation technique disclosed in U.S. Pat. No. 4,044,193.

These and other noble metals-on-carbon prepared by different known methods are also suitable for the purposes of this invention, though the resultant noble metal catalyst particles are usually less effective than the above described high surface area particles. For example, the known technique of using an aqueous dissolved solution of a silver salt, e.g. silver nitrate, to impregnate a high surface area carbon, followed by evaporation, yields a silver-on-carbon useful as an oxygen reduction electrocatalyst in alkaline media, when applied to the carbon cloth substrate of this invention. A similar iridium-on-carbon can be incorporated in the electrodes of this invention as by the above-described method of making the electrode.

EXAMPLE 5

A special case is the metal-free catalytic carbon. An air electrode suitable for use in aqueous alkaline media was prepared by the method of Example 1 except that the sample of Vulcan XC-72 carbon, carrying no platinum or other metal, was substituted for the platinum-on-carbon sample.

Figure 3:
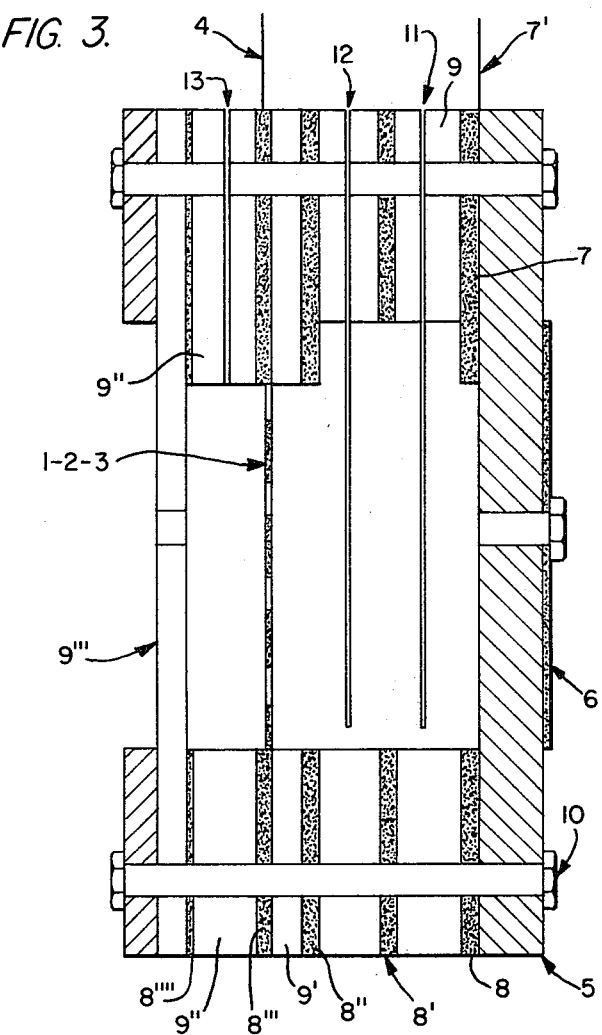
FIG. 3 is a longitudinal schematic section of an illustrative cell, illustrated as half of a caustic cell, embodying the novel electrode of FIG. 1.

The performance of the gas diffusion electrodes has been measured in a conventional half cell. For example, to evaluate air electrodes in a caustic (flowing) electrolyte, a vertical half cell of modular construction has been assembled as shown in FIG. 3. On the anode side, a square graphite endplate 5 of dimensions $4\frac{3}{4}'' \times 4\frac{3}{4}'' \times \frac{1}{2}''$, was provided with a small heater pad 6 ($2'' \times 2'' \times \frac{1}{8}''$) mounted in the center of its outer face. The heater pad 6 provided the means for operating the cell between room temperature and 100° C. A nickel foil anode 7 about 6 mils thick, consisting of a square portion about $3'' \times 3''$, with two external current collecting tabs 7' (about 3" long and $\frac{3}{4}''$ wide), was pressed against the center of the inner face of the graphite endplate 5, and the tabs 7' extended over its upper edge. Under current, oxygen is evolved on the anode. The anode is held in place by several modular components, namely (1) a first of five identical hypalon gaskets 8 ($4\frac{3}{4}'' \times 4\frac{3}{4}'' \times 3/16''$) having at the center, a square $2'' \times 2''$ opening or "window", which window defines the available electrode area; (2) a first Lucite block 9 ($4\frac{3}{4}'' \times 4\frac{3}{4}'' \times 1''$) with an opening, 2" wide and $2\frac{1}{4}''$ high, matching the window but extending $\frac{1}{4}''$ above it; (3) a second hypalon gasket 8' with matching window; (4) a thin ($\frac{1}{8}''$) Lucite plate 9' with matching window; (5) the cathode assembly consisting of an air cathode C, later described, 1 ($3'' \times 3''$ in size), a 6 mil thick nickel foil current collector 4 of the same dimensions as the anode, but having a matching window, the cathode and current collector being sandwiched between a third and fourth hypalon gaskets 8'' an 8''', (6) a second Lucite block 9'' ($4\frac{3}{4}'' \times 4\frac{3}{4}'' \times \frac{1}{2}''$), with matching window; (7) a fifth hypalon gasket 8'''' with matching window; and, finally, (8) a transparent Lucite endplate 9''' ($4\frac{3}{4}'' \times 4\frac{3}{4}''$) on the cathode side. These modular components were clamped tightly by means of eight partially Teflon-covered 3/16" stainless-steel bolts 10 with stainless steel nuts, each placed about $\frac{3}{8}''$ inside the edges of the endplates and about $1\frac{3}{4}''$ apart, and traversing the modular components between the endplates.

The opening of the Lucite block 9, which block is provided with electrolyte inlet and outlet tubes 11, is the electrolyte plenum, caustic being continuously pumped therethrough from a reservoir, not shown. The electrolyte plenum is $\frac{1}{4}''$ higher than the electrode window so that gas, e.g. oxygen, rising to the top, does not reduce available electrode area. Both gas and caustic exit from the top of the plenum, with the caustic returning to the reservoir and the gas vented to the atmosphere. The block 9 is also provided with a thermocouple mounted in a well 12. The Lucite block 9'' is provided with air inlets and outlets 13 and its window serves as the air (oxygen) chamber. The transparent Lucite endplate 9''' allows observation of the air chamber and gas side of the cathode 1-2-3.

The same half cell is also suitable for testing of hydrogen anodes. Here, the polarity is reversed, hydrogen is evolved at the now cathodic nickel foil electrode and the diffusion electrode is now anodic and is depolarized by hydrogen.

In a first series of tests the carbon cloth electrode 1-2-3 of Example 1 of the invention was used as the air cathode C in a flowing sodium hydroxide electrolyte containing 23% NaOH. $CO_2$-free air was fed to the air cathode C and the cathode voltages were measured vs. the Hg/HgO reference electrode (plotted along the ordinate in FIG. 2) as a function of current density (plotted along the abscissa). The cell temperature was kept at 75° C.

Figure 2:
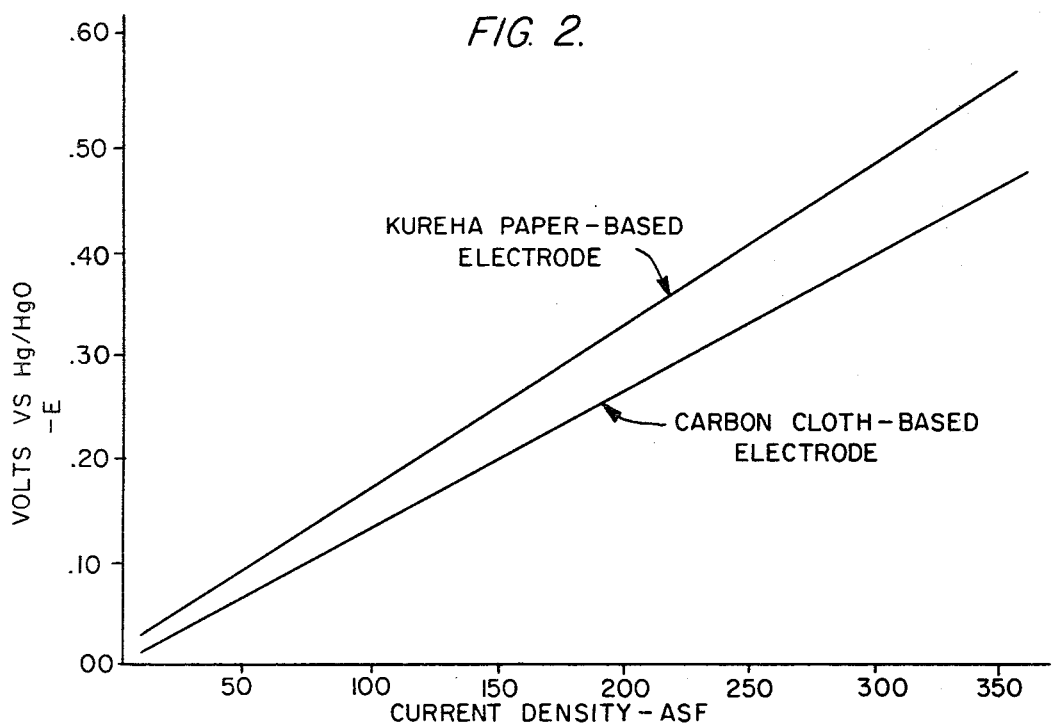
FIG. 2 is a graph illustrating the performance of the same.

For purposes of comparing performance, a carbon paper-based electrode was also made in accordance with the exact method of Example 1 above, except that a porous carbon paper of the same thickness as the carbon cloth substrate was substituted for the cloth 1. A porous carbon paper, sold under the trade name KUREHA paper (marketed by the Mitsubishi International Corporation, New York, NY) and generally described in U.S. Pat. No. 3,932,197, col. 2, lines 31-32, was used "as is"; that is, without a Teflon pre-treatment which would increase its electric resistivity. The paper-based electrode was then tested on $CO_2$-free air, again recording cathode potential vs. current density. FIG. 2 and Table 1 show the voltages obtained in the two above-described tests. Comparison of the data obtained with the electrode of Example 1 and the paper-based electrode illustrates the superiority in performance of the cloth-based electrode of the invention.

TABLE 1

| | Cathode Voltage vs. Hg/HgO Reference | |
|---|---|---|
| Current Density (ASF) | Electrode of Example 1 (Carbon Cloth-based) | Kureha Paper-based Electrode |
| 10 | −0.01 | −0.03 |
| 50 | −0.08 | −0.10 |
| 100 | −0.15 | −0.17 |
| 150 | −0.21 | −0.25 |
| 200 | −0.27 | −0.33 |
| 250 | −0.32 | −0.41 |
| 300 | −0.39 | −0.48 |
| 350 | −0.46 | −0.57 |

The larger the absolute magnitude of the voltage, the higher the voltage loss due to polarization of the electrode. It is seen from FIG. 2 and Table 1, that the improvement in performance of the carbon cloth vs. the paper electrode is most pronounced at the high current densities of the order of 250 ASF or more, which are required for economical operation of chlor-alkali cells or metal-air batteries, for example.

The overall performance of gas diffusion electrodes, as expressed in cell voltage generation or saving, it not only determined by its electrocatalytic efficiency, but also by other factors. The electron-ion interaction of the electrode reaction occurs on an electrocatalytic site where simultaneous three-phase contact must be effected between the active gas, the solid electrocatalyst and the liquid electrolyte. For the electrode to function under significant current densities, the electrons must be rapidly conducted to or from the catalytic site. With carbon-substrate based electrodes it is known that current collection is a significant factor determining electrode performance.

In the case of conducting current from an individual thin carbon cloth-based electrode to an external circuit, contact is made between the electrode and a metallic conductor to the external circuit, as for example, by means of a metal foil window frame 4, FIG. 1, pressed against the rim of the electrode, the window area defining the available or exposed electrode area and the frame having metal tabs which are the contacts to the circuitry. When the metal foil is non-noble metal, such as nickel, it needs to be protected from contact with electrolyte and/or active gas, for example, by electrically-insulating gaskets made of rubber, plastic or the like. To avoid excessive losses of available or exposed electrode area in arrangements of this kind, the window area should be large relative to the rim area. The electrode itself has to carry electrons from the electrocatalytic sites to the rim, edge or frame. While the combination of carbon cloth and the catalyst layer embedded therein and bonded thereto is surprisingly effective as conductor in cell operation, as compared with the electrical conductivity of the carbon cloth substrate, we have found, however, that there is still an appreciable IR-loss in the thin carbon cloth-based electrode, especially under current densities in excess of about 75 ASF.

Hence, for use in an electrochemical cell operating at high current densities and requiring current collection from individual electrodes, it is often desirable to improve the current carrying capability of the carbon cloth-based electrodes. One approach that we have found to be successful in this endeavor is to carry electrons from interior portions of the cloth by metallic conducting paths apart from the carbon cloth and in contact with the same, such as a noble metal screen as of gold-plated nickel, to the current collecting or contact frame.

We have found that the current carrying capability of the carbon cloth-based electrodes can be spectacularly enhanced by current collecting means comprising closely spaced noble metal contacts electrically connected to the electrode. Non-noble metal contacts are not desireable as they suffer from the corrosion effects described above not only in acid, but surprisingly also in base. With air cathodes in alkaline media, silver is the preferred contact material, is it is the best and lowest-cost conductor amoung the noble metals. With hydrogen electrodes in metal electrowinning cells, the current collection problem is less severe when these cells are operated at current densities below 75 amps/sq ft, as is usually the case. However, using, for example, electrodes having exposed areas of one square foot or more, improved current collection in acid media is obtained by the use of acid-resistant noble metal contacts, preferably gold contacts.

Other techniques of assembling cloth electrodes and appropriate current collectors will occur to those skilled in the art, being predicated on the principle that the current collecting means comprise closely spaced contacts electrically connected to the electrode, the contacts being made of noble metals and carrying current from interior portions of the carbon cloth electrode to the edge thereof, with contact being enabled with aqueous elecrolyte wetting at least about 75% of the exposed area of the electrode and wherein the current collecting means is effectively converted to less than about 25% of said area.

The electrodes and assemblies of this invention are useful in many electrochemical cells including those referred to above. By way of further example, the electrode of Example 1, which has been life tested in the above-described half cell of FIG. 3 over a period of more than one year at a current density of 300 ASF, a temperature of 75° C. and with a caustic electrolyte containing 23% NaOH, was also tested in a chlor-alkali cell comprising a NAFION cation-exchange membrane, wherein the cloth electrode was substituted for the conventional steel cathode. A net voltage gain of 0.8 volts resulted from the use of the carbon cloth elecrode of Example 1 in lieu of the standard steel cathode.

It is noted that the half cell test described in this specification has been used in a manner substantially duplicating the operating condition of a typical ion-exchange membrane chlor-alkali cell. The electrode of Example 5 was tested in this half cell and showed a voltage gain of the order of 0.7 volts vs. the Hg/HgO reference electrode. The performance decay of this noble metal-free electrode with time, however, was more pronounced than that of the electrode of Example 1 in the same environment and under the similar operating conditions.

By way of further examples, the electrodes 1-2-3 of Examples 1-4 were tested in a copper electrowinning fuel cell as described in commonly owned U.S. Pat. NO. 3,793,165 using hydrogen as the fuel, a copper cathode and an aqueous copper sulfate-containing electrolyte. Open cell voltages of between 0.31 and 0.33 volts were obtained and, upon substantially shorting the cell, i.e. decreasing the voltage to less than 0.1 volt, cathodic copper was deposited at current densities ranging between 15 to 20 amps/sq ft. These same electrodes were also tested in a driven zinc electrowinning cell such as described for example in U.S. Pat. No. 3,124,520, embodying a zinc cathode and an aqueous zinc-containing electrolyte, such as zinc sulfate. Here a voltage saving of between 1 and 1.5 volt was noted when the combination of the hydrogen electrode of this invention with associated diaphragm was substituted for the conventional lead anode. Still by way of another example, the electrode 1-2-3 of Example 1 was tested in the aluminum air battery described in the paper entitled "General-Purpose Aluminum-Air/Flywheel Electric Vehicles", by J. F. Cooper and E. Behrin, presented at the Fall meeting of the Electrochemical Society, Pittsburgh, PA, October, 1978 (Paper No. 106). At a current density of 2.5 KAmps/m$^2$, this cloth-based electrode 1-2-3 operated at a polarization voltage loss of only 0.2 volts.

The utility of the electrode assemblies of this invention is not limited to the above-named cells, but extends to others including fuel cells, cells generating oxygen from air and the like; and further uses and modifications will occur to those skilled in this art, being considered to fall within the spirit and scope of the invention as defined in the appended claims.

What is claimed is:

1. A thin electrocatalytic gas diffusion electrode comprising an open pore electrically conducting carbon cloth having a coating of a uniform mixture of catalytic carbon particles and hydrophobic binder particles evenly deposited on said cloth, with said mixture of particles adhered within the cloth pores and to the yarns of the cloth.

2. The electrode of claim 1 and in which said catalytic carbon particles comprise catalytic metal particles deposited on high surface area carbon carrier particles.

3. The electrode of claim 1 and in which said catalytic carbon particles comprise metal-free cataytic carbon particles.

4. The electrode of claim 1 and in which the binder particles are of a fluorinated hydrocarbon polymer.

5. The electrode of claim 4 wherein said cloth has a thickness between 5 and 40 mils and between about 20 and 50 yarns/inch with a warp-to-fill ratio substantially equal to one, plus or minus 10%.

6. The electrode of claim 5 wherein said catalytic carbon particles comprise noble metal particles having been uniformly deposited on high surface area carbon carrier particles, such noble metals being selected from the group consisting of platinum, palladium, rhodium, ruthenium, iridium and silver, and being present in amount between substantially 1% and 25% by weight of said carbon carrier particles and wherein said fluorinated hydrocarbon polymer is present in amount between substantially 25% and 75% by weight of said mixture.

7. The electrode of claim 6 wherein said noble metal particles are platinum particles substantially in the range of substantially 15 A–25 A in size and wherein said platinum loads the electrode surface in amount between substantially 0.04 mg/cm$^2$ and 0.5 mg/cm$^2$.

8. A gas diffusion electrode-current collector assembly comprising the electrode of claim 1 and current-collecting means contacting the said electrode.

9. The electrode-current collector assembly of claim 8 and in which said current-collecting means comprises a plurality of metallic current-carrying paths contacting the exposed area of said electrode.

10. The electrode-current collector assembly of claim 9 and in which said current-carrying paths extend from interior portions of said cloth to the edge thereof.

11. The assembly of claim 10 and in which said noble metal is silver.

12. In an electrochemical cell, the assembly of claim 8 in contact with an aqueous electrolyte wetting at least 75% of the exposed area of said electrode and wherein said current-collecting means comprise contacts electrically connected to less than 25% of said area.

13. The cell of claim 12 wherein said electrolyte is freeflowing.

14. The cell of claim 13 wherein said electrolyte comprises concentrated aqueous alkaline hydroxide and said electrode is an air cathode provided with $CO_2$-free air.

15. The cell of claim 8 wherein said electrode is connected as an anode provided with hydrogen.

16. The cell of claim 15 wherein the cell is a copper electrowinning cell having a copper cathode in aqueous copper sulfate-containing electrolyte.

17. The electrode of claim 1 wherein the electrode is in contact with an aqueous copper sulfate electrolyte and is disposed to diffuse hydrogen therethrough to withdraw copper from the electrolyte.

* * * * *